United States Patent [19]

Leight-Monstevens et al.

[11] Patent Number: 5,092,125
[45] Date of Patent: Mar. 3, 1992

[54] SEAL

[75] Inventors: Keith V. Leight-Monstevens; Leslie P. Branum, both of Troy; David L. Wrobleski, Romeo, all of Mich.

[73] Assignee: Automotive Products plc, Warwickshire, England

[21] Appl. No.: 506,596

[22] Filed: Apr. 6, 1990

Related U.S. Application Data

[63] Continuation of Ser. No. 114,029, Oct. 29, 1987, abandoned.

[51] Int. Cl.$^5$ .............................................. B60T 11/00
[52] U.S. Cl. ...................................... 60/589; 92/245; 277/206 R
[58] Field of Search ............... 277/205, 206 A, 205 R, 277/207 R, 208; 92/130 R, 163, 240, 242–245, 250, 253, 257; 60/533, 585, 581, 589

[56] References Cited

U.S. PATENT DOCUMENTS

| | | | |
|---|---|---|---|
| 2,081,040 | 5/1937 | King | 277/205 X |
| 2,700,561 | 1/1955 | Svenson | 286/7 |
| 2,884,291 | 4/1959 | Whitten | 92/240 X |
| 2,895,773 | 7/1959 | McConnaughey | 309/23 |
| 3,288,475 | 11/1966 | Benoit | 277/205 |
| 3,550,990 | 12/1970 | Rentschler | 277/205 |
| 3,563,442 | 2/1971 | Kretchman | 277/208 |
| 3,921,991 | 11/1975 | Beck | 277/205 |
| 4,195,849 | 4/1980 | Taft | 277/205 X |
| 4,371,177 | 2/1983 | Bahr et al. | 277/206 A X |
| 4,407,125 | 10/1983 | Parsons | 60/585 X |
| 4,417,503 | 11/1983 | Izumi | 277/205 X |
| 4,476,772 | 10/1984 | Gorman et al. | 277/205 X |
| 4,477,091 | 10/1984 | Adamek | 277/205 X |
| 4,534,172 | 8/1985 | Price et al. | 60/581 X |
| 4,671,065 | 6/1987 | Ishiwata | 60/533 |
| 4,750,847 | 6/1988 | Boyd | 277/206 A X |

FOREIGN PATENT DOCUMENTS

| | | | |
|---|---|---|---|
| 734836 | 5/1966 | Canada | 60/585 |
| 0235568 | 9/1987 | European Pat. Off. | |
| 1421264 | 11/1965 | France | 277/205 |
| 448212 | 5/1949 | Italy | 60/533 |
| 569673 | 11/1957 | Italy | 277/205 |
| 31681 | 3/1980 | Japan | 60/533 |
| 263023 | 3/1961 | Netherlands | 277/205 |
| 810625 | 3/1959 | United Kingdom | 122/1 |
| 860090 | 2/1961 | United Kingdom | 8/2 |
| 1142265 | 2/1969 | United Kingdom . | |
| 1449220 | 9/1976 | United Kingdom . | |
| 1466733 | 3/1977 | United Kingdom . | |
| 1498181 | 1/1978 | United Kingdom . | |
| 2012392 | 7/1979 | United Kingdom . | |
| 2102898 | 2/1983 | United Kingdom . | |
| 2127110 | 4/1984 | United Kingdom . | |
| 2138516 | 10/1984 | United Kingdom . | |
| 2168438 | 6/1986 | United Kingdom . | |

OTHER PUBLICATIONS 3 pages of catalog of Minnesota Rubber Company entitled "Fact Book and Design Guide".

Primary Examiner—Edward K. Look
Assistant Examiner—Hoang Nguyen
Attorney, Agent, or Firm—Krass and Young

[57] ABSTRACT

An annular elastomeric seal, a piston utilizing the seal, and a fluid cylinder assembly utilizing the seal. The seal includes an axially forward portion defining a circumferentially inner and a circumferentially outer deflectable lip seal and an axially rearward portion defining a circumferentially inner and a circumferentially outer arcuate heel seal. When positioned in an annular groove in a piston and with the piston slidably received in the bore of a cylinder, the annular seal provides fluid pressure sealing at the deflectable lip seals, provides secondary fluid pressure sealing at the arcuate heel seals, provides air sealing at the arcuate heel seals, and functions at the arcuate heel seals to preclude the entry of contaminants into the sealing interfaces. The seal is especially effective when employed in a hydraulic pressure cylinder of the center feed type since it allows the usage of a single annular seal positioned in a singular annular groove in the piston.

3 Claims, 2 Drawing Sheets

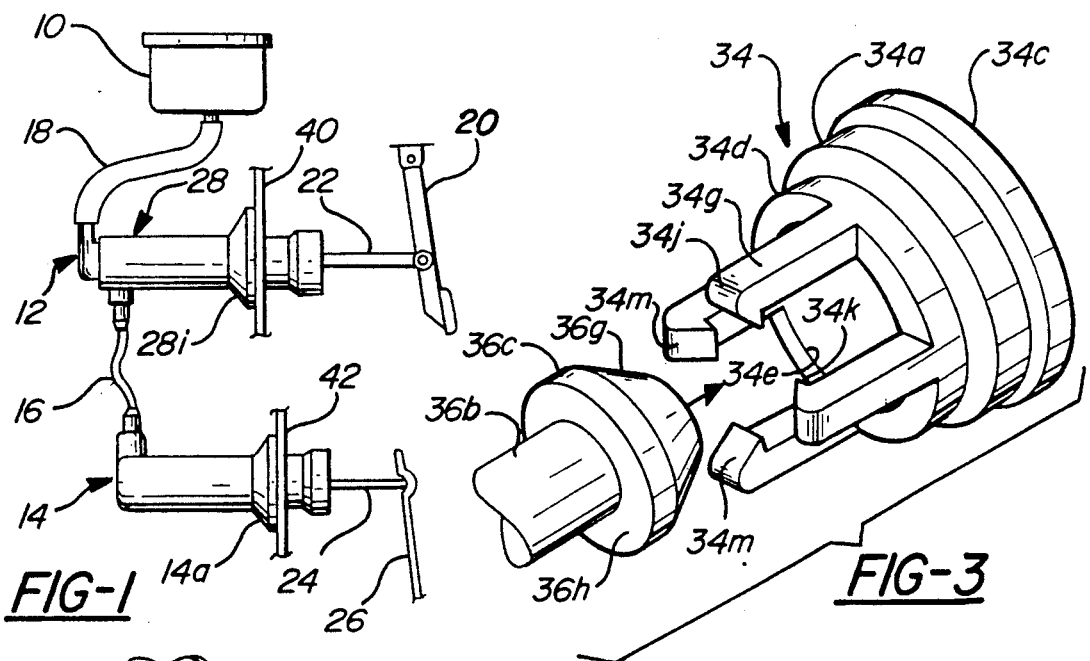
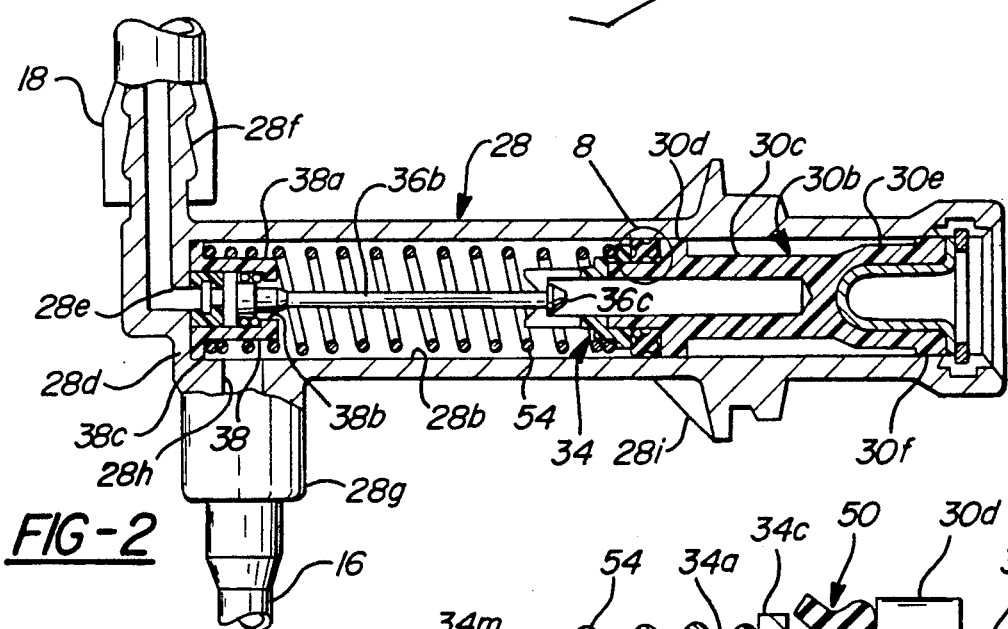
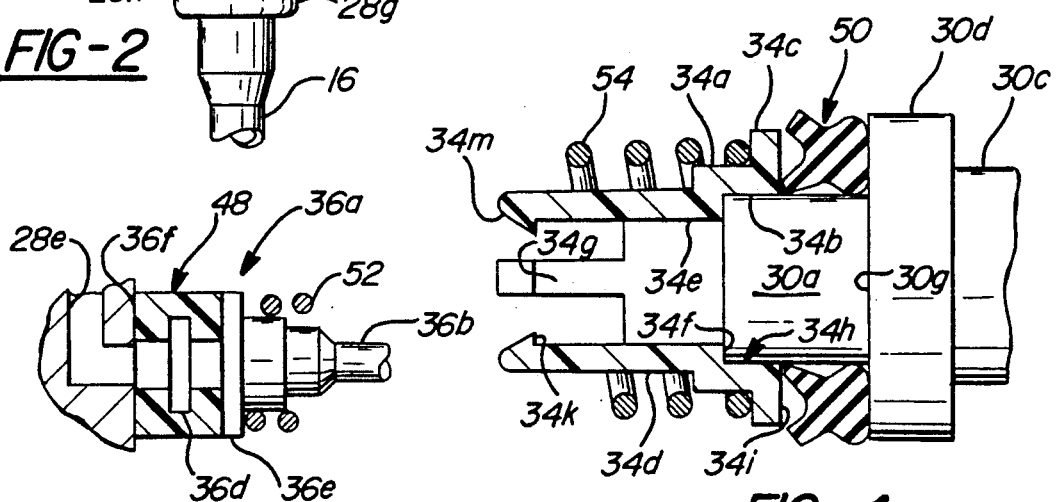

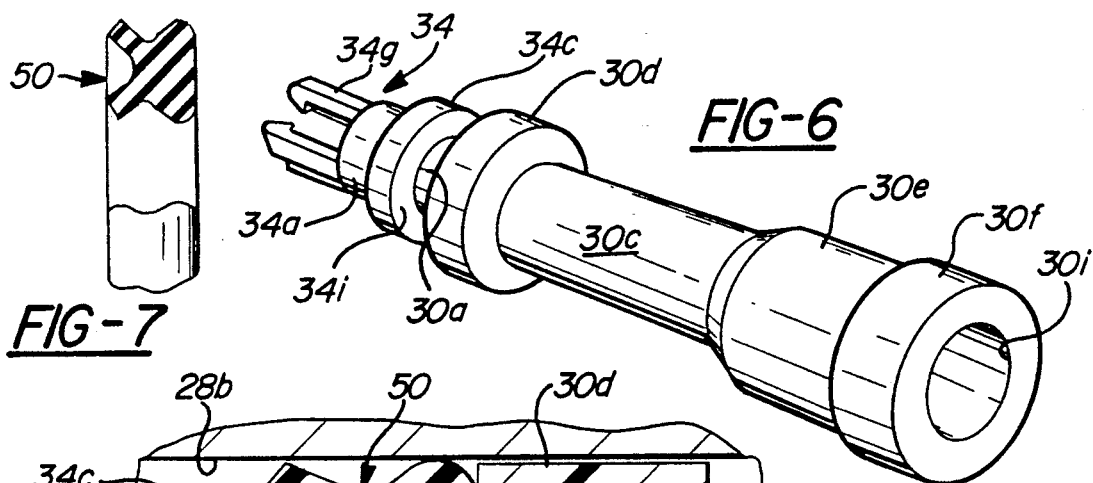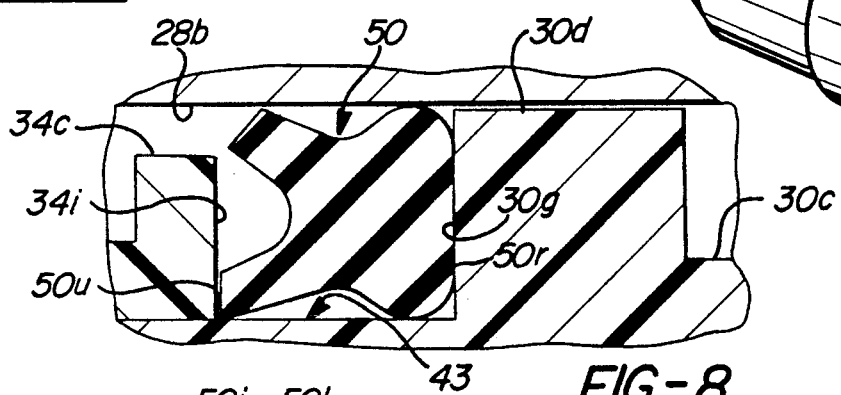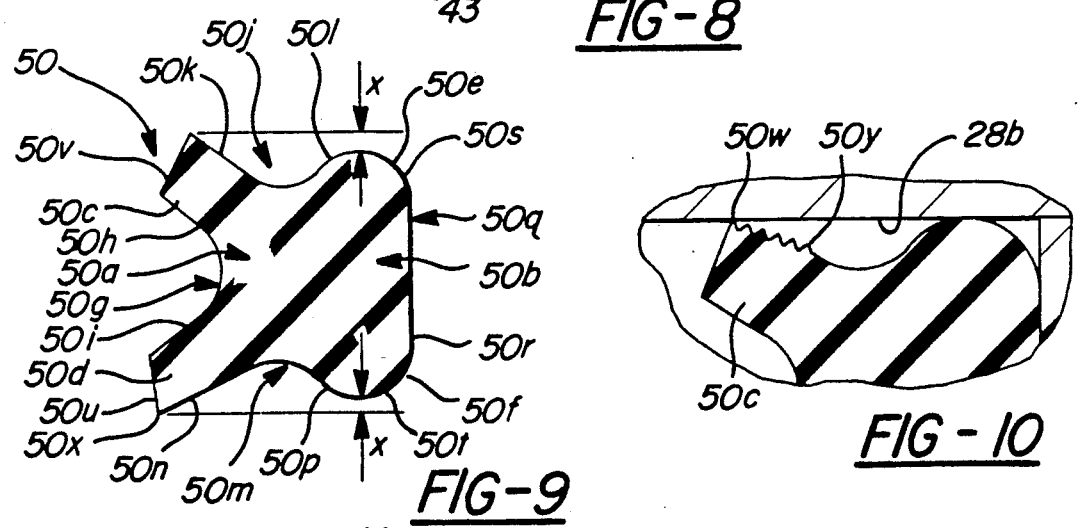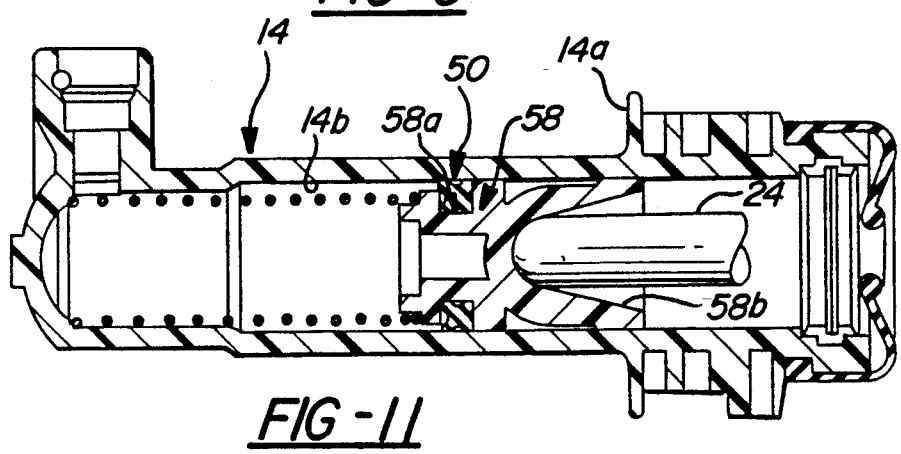

SEAL

This is a continuation of co-pending application Ser. No. 114,029 filed on Oct. 29, 1987, now abandoned

BACKGROUND OF THE INVENTION

This invention relates to hydraulic cylinders and more particularly to a piston and seal assembly especially suitable for use in a hydraulic cylinder and to a seal especially suitable for use in a piston and seal assembly.

In a hydraulic cylinder, it is imperative for the effective operation of the cylinder that adequate sealing be provided between the piston assembly and the bore of the cylinder. This sealing is necessary in order to ensure that pressure fluid does not leak past the piston in one direction, that air does not leak past the piston in the opposite direction, and that contaminants are kept out of the sealing interface to maintain an effective air and pressure fluid seal between the piston and the bore of the cylinder.

Prior art attempts to provide the pressure fluid, air, and contaminant sealing functions have typically consisted of one or more annular seals either disposed in an external annular groove in the piston or in an internal annular groove in the cylinder. However, the prior art sealing systems have either not provided an effective seal with respect to the air, pressure fluid, or contaminants, or have provided an effective seal only by the use of a complex and expensive multiple seal arrangement.

SUMMARY OF THE INVENTION

This invention is directed to an improved seal for use in the piston assembly of a hydraulic cylinder.

More specifically, this invention is directed to the provision of an improved hydraulic cylinder sealing arrangement which is simple and inexpensive and yet which provides effective pressure fluid, air, and contaminant sealing.

According to an important feature of the invention, an annular elastomeric seal is provided comprising, in cross section, an axially forward portion defining a circumferentially outer deflectable lip seal and an axially rearward portion defining a circumferentially outer arcuate heel seal. This simple cross-sectional configuration provides, in a single annular seal, effective pressure fluid, air, and contaminant sealing when the invention seal is employed in an annular groove in the piston assembly of a hydraulic cylinder. Specifically, the forward deflectable lip seal provides pressure fluid sealing and the rearward arcuate heel seal provides secondary pressure fluid sealing, provides air sealing, and precludes the entry of contaminants into the sealing interfaces.

According to a further feature of the invention, the axially forward portion of the seal further defines a circumferentially inner deflectable lip seal and the axially rearward portion of the seal further defines a circumferentially inner arcuate heel seal. The inner lip seal and the inner heel seal provide sealing actions which augment the sealing actions of the outer lip seal and the outer heel seal so that the four seals provide, in combination, an extremely effective seal with respect to pressure fluid, air, and contaminants.

According to a further feature of the invention, the annular elastomeric seal includes a forward annular groove in the forward portion thereof opening at the front edge of the seal and defining the radially inner annular surface of the outer deflectable lip seal and the radially outer annular surface of the inner lip seal. This simple groove construction allows the ready and inexpensive formation of the deflectable lip seals.

According to a further feature of the invention, the seal further includes an outer annular groove opening at the radially outer edge of the seal and defining the radially outer annular surface of the outer deflectable lip seal and the axially forward annular surface of the outer arcuate heel seal, and an inner annular groove opening at the radially inner edge of the seal and defining the radially inner annular surface of the inner deflectable lip seal and the axially forward annular surface of the inner arcuate heel seal. This simple inner and outer groove arrangement provides a convenient and inexpensive means of defining the circumferentially inner and outer surfaces of the seals.

According to a further feature of the invention, the rear edge of the seal comprises a flat annular surface generally normal to the central axis of the seal but rounded at its circumferentially outer and inner edges to respectively form the axially rearward annular surface of the outer heel seal and the axially rearward annular surface of the inner heel seal. This rear edge surface allows the seal to fit snugly within the annular groove of the associated piston while further defining the rearward annular surfaces of the outer and inner heel seals The invention further provides a novel piston assembly. The piston assembly of the invention comprises means defining an annular seal groove in the piston assembly concentric to the central longitudinal axis of the piston assembly, and an elastomeric seal positioned in the groove and including an axially forward seal portion defining a circumferentially outer deflectable lip seal and an axially rearward seal portion defining a circumferentially outer arcuate heel seal. This simple arrangement allows the piston assembly to be employed in the bore of a hydraulic cylinder with the deflectable forward lip seal providing pressure fluid sealing and the rearward arcuate heel seal providing secondary pressure fluid sealing, air sealing, and contaminant sealing.

According to a further feature of the invention, the piston assembly is devoid of any further annular seal grooves. This arrangement, in which only a single annular seal groove is employed in the piston, allows the remainder of the body of the piston to be designed to maximize piston strength and to maximize the manner in which the associated pushrod is mounted in the rear end of the piston.

According to a further feature of the invention, the annular seal groove is defined adjacent the forward end of the piston assembly and a blind axial bore is provided in the rearward end of the piston assembly. This arrangement allows the dimensioning of the axial bore in the rearward end of the piston assembly receiving the associated pushrod to be optimized without regard to the weakening effect of an annular seal groove in the rearward end of the piston assembly.

According to a further feature of the invention, a forward blind axial bore is provided in the forward end of the piston assembly. This arrangement allows the piston assembly to be employed in conjunction with a center feed cylinder assembly and, specifically, allows the valve stem of the center feed piston assembly to move reciprocally in the forward blind axial bore provided in the piston assembly.

According to a further feature of the invention, the piston assembly includes a piston including a main body portion and a forward reduced diameter nose portion forming an annular shoulder at its forward end with the main body portion, and an annular adapter member fitted at its rearward end over the forward end of the piston nose portion with its rearward annular edge spaced from the annular shoulder to define the annular seal groove therebetween. This arrangement provides a simple and inexpensive means of defining the annular seal groove in the piston assembly and provides a seal groove that is devoid of molding flash.

According to a further feature of the invention, the adapter member includes coupling means at its forward end for coupling receipt of a valve stem of a center feed cylinder assembly and the forward blind axial bore extends rearwardly through the annular adapter member, through the piston nose portion, and into the piston main body portion. This arrangement allows the adapter member to function both as a means of defining the annular groove of the piston assembly and as a means of coupling the forward end of the valve stem of the associated center feed cylinder assembly.

In the disclosed embodiment of the invention, in which the invention seal is utilized in a piston assembly of a center feed hydraulic cylinder, a reservoir port is provided in the forward end wall of the cylinder; a valve stem extends axially in the bore of the cylinder forwardly of the piston assembly; a valve member carried on the forward end of the valve stem coacts with the reservoir port in response to reciprocal movement of the piston assembly in the bore of the cylinder; and the rearward end of the valve stem is coupled to the forward end of the annular adapter member in a manner to pull the valve member out of seating engagement with the reservoir port as the piston assembly moves to its fully retracted position but to allow movement of the rearward end of the valve stem into the forward blind bore in the piston assembly in response to forward stroking movement of the piston assembly.

BRIEF DESCRIPTION OF THE DRAWINGS

FIG. 1 is a schematic view of a hydraulic apparatus including a master cylinder and a slave cylinder constructed in accordance with the invention;

FIG. 2 is a fragmentary cross-sectional view of the master cylinder of the hydraulic apparatus of FIG. 1;

FIG. 3 is a fragmentary perspective view of a valve stem retainer embodied in the master cylinder of FIG. 2;

FIG. 4 is a cross-sectional view of the valve stem retainer embodied in the master cylinder of FIG. 2;

FIG. 5 is a detailed view of the valving structure at the forward end of the valve stem in the master cylinder of FIG. 2;

FIG. 6 is a perspective view of the piston assembly employed in the master cylinder of FIG. 2;

FIG. 7 is a fragmentary view of an annular elastomeric seal employed in the master cylinder of FIG. 1 as well as in the slave cylinder of FIG. 1;

FIG. 8 is a fragmentary detail view taken within the circle 8 of FIG. 2;

FIG. 9 is a cross-sectional view of an enlarged scale of the seal of FIG. 7;

FIG. 10 is a fragmentary cross sectional view of a modified form of invention seal; and FIG. 11 is a cross-sectional view of the slave cylinder of FIG. 1.

DETAILED DESCRIPTION OF THE PREFERRED EMBODIMENTS

The hydraulic apparatus shown schematically in FIG. 1 includes a reservoir 10, a master cylinder assembly 12, a slave cylinder assembly 14, a high pressure conduit 16 interconnecting the outlet of master cylinder 12 and the inlet of slave cylinder 14 and a low pressure supply conduit 18 interconnecting the outlet of reservoir 10 and the inlet of master cylinder 12. The hydraulic apparatus of FIG. 1 may be utilized for example in a motor vehicle wherein actuation of a clutch pedal 20 by the vehicle operator strokes the piston rod 22 of the master cylinder 12 to force pressurized fluid outwardly from cylinder 12 through conduit 16 to slave cylinder 14 where the pressurized fluid acts to move output member 24 outwardly to actuate a clutch release lever 26. An hydraulic apparatus of the general type shown in FIG. 1 is disclosed, for example, in U.S. Pat. No. 4,599,860 to David Parsons and assigned to Automotive Products, plc, of Warwickshire, England.

Master cylinder assembly 12 includes a cylinder 28, a piston 30, a annular insert 32, an adapter member 34, a valving assembly 36, and a valve guide member 38.

Cylinder 28 may be formed of plastic or other suitable rigid material and includes a main body portion 28a; an axially extending pressure chamber 28b; an open rear end 28c; a front end wall 28d; a reservoir port 28e defined centrally in front end wall 28d; an inlet fitting 28f communicating with reservoir port 28e and receiving the lower end of supply conduit 18; a discharge fitting 28g communicating with the upper end of working pressure conduit 16 and defining a discharge port 28h; and a flange portion 28i for use in securing the cylinder to a suitable vehicular bulkhead 40. Slave cylinder 14 is similarly secured to a vehicle bulkhead 42 by the use of slave cylinder flange portion 14a.

Piston 30 may also be formed of a suitable plastic material such, for example, as glass reinforced nylon or a lubricated plastic including an internal lubricant such as molybdenum disulfide or a low friction polymer such as polytetrafluoroethylene. Piston 30 includes a reduced diameter nose portion 30a at its front end and a main body portion 30b. Main body portion 30b includes a central spool portion 30c, a front flange or land portion 30d, an enlarged diameter rear portion 30e, and a rear flange or land portion 30f. Nose portion 30a forms an annular shoulder 30g with land portion 30d.

A blind bore or socket 30h is provided in the rear face of the piston and includes a main body cylindrical portion 30i extending forwardly from the rear face of the piston and a generally hemispherical front end portion 30j. Socket 30h is centered on the center line of piston 30 and on the center line of cylinder 28.

Annular insert 32 is formed as a metal stamping and includes a cylindrical main body portion 32a, a generally hemispherical front end portion 32b, and an annular flange portion 32c at the rear end of the insert member. A plurality of prongs or tabs 32d are struck inwardly from main body portion 32a at circumferentially spaced locations thereabout. Prong portions 32d extend inwardly and forwardly toward hemispherical front end portion 32b. Insert 32 is preferably formed of a ferrous material but may also be formed of other metallic materials.

Adapter member 34 is generally annular and is preferably formed of a suitable plastic material, preferably identical to the material utilized for the piston 30. Retainer 34 includes an annular main body portion 34a defining a bore 34b, a rear flange portion 34c, a hub portion 34d defining a central bore 34e which in turn forms an annular shoulder 34f with bore 34b, and a plurality of resilient finger portions 34g extending forwardly in cantilever fashion from hub portion 34d in circumferentially spaced relation about central bore 34e.

Bore 34b and shoulder 34f together define a socket 34h sized to telescopically receive nose portion 30a of piston 30. Bore 34b has an axial length substantially less than the axial length of piston nose portion 30a so that, with the rear end of adaptor member 34 fitted over the front end of nose portion 30a and the front end of the nose portion abutted against shoulder 34f, the rear annular edge face 34i of retainer 34 coacts with piston nose portion 30a and piston annular shoulder 30g to define an annular, radially outwardly opening seal groove 43.

Each finger portion 34g includes a head portion 34j at the free forward end of the finger portion. Each head portion 34j extends radially inwardly from the main body portion of the associated finger portion to define a radially inwardly extending shoulder surface 34k. Each head portion further defines a camming surface 34m.

Valve assembly 36 includes a valving member 36a, a valve stem 36b, and a valve stem head portion 36c. Valving member 36a includes axially spaced flange portions 36d and 36e at the forward end of valve stem 36b and a cup shaped resilient sealing member 48 fitted around flange portion 36d, filling the space between flange portions 36d and 36e, and extending forwardly from flange portion 36d to present an annular sealing surface 36f for coaction with cylinder end wall 28d around reservoir port 28e. Valve stem head portion 36c is generally conical in configuration and defines a conical camming surface 36g at the rear face of the head portion and an annular shoulder 36h at the front face of the head portion.

Valve guide member 38 may be formed of a suitable plastic material and includes a main body generally cylindrical portion 38a defining a central bore 38b at its rear face slidably passing the forward end of the valve stem and an annular flange portion 38c at the front face of the guide member. A plurality of circumferentially spaced openings 38d are provided in main body portion 38a.

To assemble the invention center feed master cylinder, annular insert 32 is positioned in socket 30h; an annular elastomeric seal 50 is positioned on nose portion 30a of the piston against the annular shoulder 30g; adapter member 34 is fitted over the nose portion 30a of the piston to position the rear annular face 34i of the retainer member against seal 50 and complete seal groove 43; the retainer member is secured to the piston by ultrasonic welding or the like; valve assembly 36 is assembled to valve guide 38 with a valve guide return spring 52 positioned between valving member flange 36e and the front end of valve guide member main body portion 38a; a main return spring 54 is positioned over valve guide member 38 with its front end bearing against valve guide flange portion 38c; and the subassembly comprising valve assembly 36, valve guide member 38, and return spring 54 is moved axially relative to the piston subassembly to pass valve stem head portion 36c between fingers 34g and seat the free end of spring 54 against adapter member flange portion 34c. As head portion 36c of valve stem 36b engages the front ends of fingers 34g, the cam surface 36g on head portion 34c coacts with the cam surfaces 34m on the head portions 34j of the finger portions 34g to move the free ends of the finger portions cammingly and resiliently outwardly to allow valve stem head portion 36c to pass therethrough, whereafter the shoulder surfaces 34k defined by finger portions 34g snap into place behind the annular shoulder 36h defined by head portion 36c to define the snappingly engaged coacting position of the valve stem and the adapter member. The entire assembly is now fit axially into cylinder 28 to position valve guide 38 against end wall 28d of the cylinder. In the fully inserted position of the assembly, return spring 54 biases adapter member 34 and piston 30 rearwardly to press flange portion 32c of annular insert 32 against a split ring 56 positioned in the open rear end 28c of the cylinder. In this assembled condition, valving member 36a is maintained by finger portions 34g in a position in which it is axially withdrawn from reservoir port 28e so as to allow fluid communication from the reservoir through port 28e, past annular seal 36f, and through openings 38d to thereby allow the reservoir to fill the pressure chamber 28b. Note that return spring 54 is significantly stronger than valve guide spring 52 so that spring 52 is maintained in a compressed condition in the retracted position of the piston 30.

It will be understood that the head portion o piston rod 22 of master cylinder 28 is snappingly received in insert 32 with prongs 32d engaging an annular shoulder defined on the head portion of the piston rod to preclude inadvertent withdrawal of the piston rod from the retainer. Further details of the construction of annular insert 32 and the manner in which it coacts with the head of the piston rod are disclosed in applicant's copending United States patent application Ser. No. 049133 filed on May 12, 1987.

When piston 30 is moved forwardly in cylinder 28 upon depression of clutch pedal 20 to actuate piston rod 22, valve assembly 36 initially moves forwardly with piston 30 and adapter member 34 under the urging of valve guide spring 52 to seat annular sealing surface 36f around reservoir discharge port 28e and preclude communication between the reservoir and pressure chamber 28b, whereafter continued forward movement of piston 30 under the impetus of piston rod 22 to discharge pressure fluid through conduit 16 to slave cylinder 14 is accommodated by the axial movement of head portion 36c and valve stem 36b within a blind axial bore 30k formed in the forward end of piston 30 and extending through nose portion 30a and into piston spool portion 30c. When clutch pedal 20 is thereafter released, the piston and valve stem retainer are moved through their return stroke under the urging of return spring 54. As the piston and retainer approach their fully retracted position as defined by engagement of flange portion 32c of insert 32 with split ring 56, shoulder surfaces 34k on finger portions 34e engage annular shoulder 36h on valve stem head portion 36c and move the valve assembly 36 rearwardly against the resistance of spring 52 to move annular valving surface 36f away from end wall 28d to establish fluid communication between the reservoir and the cylinder pressure chamber to ensure total filling of the pressure chamber behind the retreating piston.

In addition to facilitating the assembly and disassembly of the valve assembly, adapter member 34 further acts as an auxiliary piston member which coacts with the piston 30 to define an annular seal groove 43 which is totally free of the flash lines that would be present in groove 43 if the piston was formed of one piece and the groove was formed in a molding operation. The invention arrangement, by eliminating the mold flash lines, contributes to the effectiveness and the life of the seal.

Annular elastomeric seal 50, viewed in cross section as best seen in FIGS. 8 and 9, includes an axially forward portion 50a and an axially rearward portion 50b.

Axially forward seal portion 50a defines a circumferentially outer deflectable lip seal 50c and a circumferentially inner deflectable lip seal 50d.

Seal rear portion 50b defines a circumferentially outer, arcuate heel seal 50e, and a circumferentially inner arcuate heel seal 50f.

An annular groove 50g is provided in forward portion 50a opening at the front edge of the seal and defining the radially inner annular surface 50h of outer lip seal 50c and the radially outer annular surface 50i of inner lip seal 50d.

Seal 50 further includes an outer annular groove 50j opening at the radially outer edge of the seal and respectively defining the radially outer annular surface 50k of outer lip seal 50c and the axially forward annular surface 50l of outer heel seal 50e.

Seal 50 further includes an inner annular groove 50m opening at the radially inner edge of the seal and respectively defining the radially inner annular surface 50n of the inner lip seal 50d and the axially forward annular surface 50p of the inner heel seal 50f.

The rear edge 52 of the seal comprises a flat annular surface 50r generally normal to the seal central axis but rounded at its circumferentially outer and inner edges to respectively form the axially rearward annular surface 50s of the outer heel seal 50e and the axially rearward annular surface 50t of axially inner heel seal 50f.

The forward annular edge 50u of deflectable inner lip seal 50d is generally normal to the central axis of the seal and the forward annular edge 50b of outer deflectable lip seal 50c is skewed with respect to the central seal axis and is disposed generally normal to the midline 50w of the lip seal 50c. In the relaxed posture as seen in FIG. 9, the radially outer annular sealing edge 50w of deflectable lip seal 50c is disposed radially outwardly of the radial outermost point of heel seal 50e by a distance X and the radially inner annular sealing edge 50x of deflectable lip seal 50d is similarly disposed a distance X from the radial innermost point of arcuate heel seal 50f.

The positioning of seal 50 within annular groove 43 is seen in FIG. 8 with the piston assembly seen disposed slidably in the bore 28b of cylinder 28. The axial width of the seal as measured between rear surface 50r and front surface 50u is slightly less than the axial width of seal groove 43 so that the seal fits snugly in the seal groove with seal edge 50u juxtaposed to the annular shoulder 34i of adapter member 34 and seal annular rear surface 50r juxtaposed to the annular shoulder 30g defined by piston land portion 30d. The radial height of the seal is slightly greater than the radial height of shoulder 30g so that, in the assembled condition of FIG. 8, arcuate heel seals 50e and 50f are slightly compressed respectively against the adjacent surface of piston nose portion 30a and cylinder bore 28b and the deflectable lip seals 50c and 50d are deflected relative to the arcuate heel seals by a distance slightly greater than the distance X so that the deflectable lip seals are constantly urged radially outwardly and inwardly respectively so as to urge annular sealing edge 50w against cylinder bore 28b and urge annular sealing edge 50x against the adjacent annular surface of piston nose portion 30a.

As described and as disposed in the manner seen in FIG. 8, seal 50 serves to provide all of the necessary sealing functions for the associated cylinder assembly. Specifically, seal 50 provides a fluid pressure seal, an air seal, and a contaminant seal. The fluid pressure seal is provided by seal edges 50w and 50x of deflectable lip seals 50c and 50d; and the arcuate heel seals 50e and 50f provide secondary fluid pressure sealing, preclude the entry of air into the sealing interface and into the pressure chamber of the cylinder, and preclude the entry of contaminants into the sealing interface.

Since seal 50 provides all of the required sealing functions, piston 30 may be constructed without further annular grooves to receive further annular seals. As a result, the front end 30f of the piston is not violated or weakened by a piston groove so that the forward end of the piston may be designed, without regard to an annular groove, in a manner to optimize the mounting and receipt of the associated pushrod 22.

A modified form of the invention seal 50 is seen in FIG. 10. The seal of FIG. 10 is identical to the seal previously described with the exception that a plurality of annular serrations or ridges 50y are provided on radially outer annular face 50k of outer lip seal 50c. The serrations function to provide a plurality of annular sealing edges interfacing with the bore 28b of the cylinder so as to augment the sealing action of annular sealing edge 50w.

The invention seal is seen in FIG. 11 in use as the sealing member of the slave cylinder 14. In the slave cylinder 14, the seal 50 is received in an annular groove 58a provided at the rearward end of slave piston 58. Piston 58 is slidably received in the bore 14b of the slave cylinder and includes a socket 58b at its forward end for receipt of pushrod 24. As with its usage in the master cylinder 12, seal 50 functions in the slave cylinder 14 to provide inner and outer deflectable lip seals and inner and outer arcuate heel seals with the deflectable lip seals functioning to provide the pressure fluid seal and the arcuate heel seals functioning to provide a secondary pressure fluid seal, provide an air seal, and preclude the entry of contaminants into the sealing interfaces.

The invention will be seen to provide a novel annular elastomeric seal, to provide a piston assembly utilizing the invention elastomeric seal, and to provide a cylinder assembly utilizing the invention elastomeric seal. The invention elastomeric seal provides an inexpensive and effective means of providing pressure fluid sealing, air sealing, and contaminant exclusion in a single seal member.

Whereas preferred embodiments of the invention have been illustrated and described in detail, it will be apparent that various changes may be made in the disclosed embodiments without departing from the scope or spirit of the invention.

We claim;

1. For use in a hydraulic cylinder assembly of the type including a cylinder and a piston slidably mounted in the bore of the cylinder and dividing the bore into an axially rearward air chamber on the rear side of the piston and an axially forward hydraulic fluid pressure chamber on the front side of the piston, an annular elastomeric seal for positioning at the sliding interface of the piston and the cylinder bore, said seal having a central axis and comprising in cross section:

an axially rearward portion defining circumferential outer and inner convexly arcuate heal seals having an outer diameter greater than the diameter of the cylinder bore and an inner diameter less than the diameter of the portion of the piston in which the seal will seat;

an axially forward portion defining circumferentially outer and inner deflectable lip seals each defining only a single angular annular sealing edge, the outer sealing edge being disposed radially outwardly of the outer heal seal and the inner sealing edge being disposed radially inwardly of the inner heel seal;

an axially rearward, flat, substantially radially extending annular surface extending from the radially outer arcuate heel seal to the radially inner arcuate heel seal;

the axially extending portion of said seal between each lip seal and the respective heel seal being in the form of a smooth, continuous concavely arcuate line extending from the forward end of the respective heel seal to the rearward end of the respective lip seal so that in use the seal has only two axially spaced apart contact areas with each of the bore and piston;

said seal in use being positioned at the sliding interface between the piston and the cylinder bore of the hydraulic cylinder assembly with said arcuate heel seals under compression to urge the lip seals outwardly and inwardly against the bore and piston respectively and said axially forward portion proximate said axially forward hydraulic fluid pressure chamber, so that said lip seals preclude the movement of pressurized hydraulic fluid rearwardly therepast, and said axially rearward portion positioned proximate said air chamber, so that said heel seals preclude movement of air and contaminants forwardly therepast.

2. A seal according to claim 1 in combination with a piston assembly including an annular seal groove on said piston assembly, said piston assembly being devoid of any further annular seal groove, said seal being positioned in said groove.

3. A seal according to claim 1 in combination with a cylinder defining a central axial bore open at its rearward end and closed at its forward end, a piston assembly slidably mounted in said bore and defining an annular seal groove, said piston assembly being devoid of any further annular seal grooves, said seal being positioned in said groove.

* * * * *